United States Patent [19]
Citrin

[11] 3,707,760
[45] Jan. 2, 1973

[54] METHOD AND DEVICE FOR ARTICLE WORKING SUCH AS FRACTURING OF SEMICONDUCTOR SLICES AND SEPARATING SEMICONDUCTOR CHIPS

[75] Inventor: Paul Stuart Citrin, New Milford, Conn.

[73] Assignee: Sieburg Industries Incorporated, Danbury, Conn.

[22] Filed: May 19, 1971

[21] Appl. No.: 144,917

[52] U.S. Cl....................................29/413, 29/200 D
[51] Int. Cl...........................B23p 17/00, B23p 19/00
[58] Field of Search......29/413, 200 D, 200 R; 225/2

[56] References Cited

UNITED STATES PATENTS 3,448,510 6/1969 Bippus et al...........................29/413
3,559,855 2/1971 Barnett et al............................225/2

*Primary Examiner*—Thomas H. Eager
*Attorney*—Louis H. Reens

[57] ABSTRACT

A method and device for separating semiconductor chips are described. A heat-actuated self-expandable substrate material is provided with an expanded memorized shape. Semiconductor chips in their compact array position are supported by the self-expandable substrate which upon heating thereof expands to its memorized shape to separate the chips from one another. Several self-expandable substrate configurations are shown and an apparatus for scribing and fracturing of a semiconductor slice and separating the chips from their compact position in the fractured array is described. The self-expandable substrate material is characterized by its accurately predictable expansion to provide uniform chip separations suitable for subsequent handling.

16 Claims, 17 Drawing Figures

INVENTOR.
Paul S. Citrin
BY
Louis H. Reens
ATTORNEY.

INVENTOR.
Paul S. Citrin
BY
Louis H. Reens
ATTORNEY.

METHOD AND DEVICE FOR ARTICLE WORKING SUCH AS FRACTURING OF SEMICONDUCTOR SLICES AND SEPARATING SEMICONDUCTOR CHIPS

BACKGROUND AND SUMMARY OF THE INVENTION

This invention relates to a method and device for handling minute articles such as semiconductor elements and the like. More specifically this invention relates to a method and device for separating semiconductor chips fractured from a common semiconductor slice.

In a method and device for handling minute articles such as semiconductor elements and the like in accordance with the invention, a self-expandable substrate is employed. The substrate supports the minute articles and upon the application of heat controllably expands to correspondingly separate the articles with preserved relative positions.

In the manufacture of semiconductor devices such as diodes, transistors or integrated circuits a slice of semiconductor material is formed with a large number of such semiconductor devices arranged in a controlled pattern. The devices are disconnected from one another usually by first scribing the slice and then fracturing the slice along the scribe lines. The fracturing or cutting of the slice leaves the individual semiconductor chips, due to their crystalline structure, in closely spaced but usually edge-overlapping relationship with each other. Further use of the chips involves their individual removal and application to a circuit with which the chips may be electrically coupled, such as by wire bonding or the like.

For a variety of reasons it is preferred that the chips remain in a known orientation with one another after fracturing. For example, chips from a particular region of the slice may exhibit preferred semiconductor characteristics and the preservation of chip positions after fracturing enables the circuit assembler to take advantage of such characteristics. Also, in the automatic assembly of chips with circuits, a known position and orientation of the individual chips is desirable to enable precision indexing of the automated equipment. The automated equipment indexes over the chips and removes the chips from their position in the array while precisely locating such chip with respect to the circuit with which it is to be connected.

When a slice of scribed semiconductor material is fractured, the edges of the chips either overlie or underlie the edges of adjacently located chips. This overlapping relationship of chip edges arises because the cleavage of the slice along the scribe lines propagates along crystal planes which are not always transverse to the slice surface. In order to be able to individually remove a chip without disturbing adjacent chips, it is desired to separate the chips from one another while retaining their relative positions and orientations.

One method proposed for matrix spreading may be as described in the U.S. Pat. to Bippus et al. 3,448,510. As described in this patent, a slice of semiconductor material is placed on stretchable membrane. The slice is fractured along scribe lines and subsequently the membrane is subjected to mechanical stresses which spread the membrane and thus also the chips. The stretching of the membrane is accomplished by pulling a circular membrane over a mandrel with the portion of the membrane on the top of the mandrel supporting the fractured slice. As the membrane is pulled, it stretches and separates the chips from one another. The membrane may be of a sheet material such as thin elastic rubber or a thin elastic nylon sheet.

The employment of elastic stretchable membranes for supporting separated chips introduces material handling problems. The separated chips require transfer to stable substrates prior to releasing the stresses applied to the membrane lest the membrane return to its original shape and the chips's separation is lost.

In another known method for separating chips from a fractured wafer, a slice of fractured semiconductor material is located on a flexible thermoplastic sheet. A heated mandrel is brought into contact with the thermoplastic sheet to stress it and cause an expansion thereof to separate the chips. As the mandrel cools, the thermoplastic cools and sets in the expanded state. The amount of sheet expansion is dependent upon mandrel temperature and cooling rate. Accordingly, sheet expansion is difficult to control and desired tolerances on chip separations are difficult to hold. Furthermore, the handling of separated chips on flexible substrates is not sufficiently compatible with automated production techniques and assembly to circuits where a rigid substrate for support of the chips is desired, unless a secondary carrier is provided.

In a method for handling semiconductor chips in accordance with the invention, fractured chips are separated by a heat-actuated self-expandable material. The self-expandable material provides precisely controllable expansions so that chip separations are accurately predictable. This self-expandable material remains advantageously associated with the separated chips for ease of handling in subsequent production uses such as with the assembly of circuits or when packaged for shipment.

As specifically described herein for a preferred embodiment of the invention, a material is selected which exhibits a memory characteristic when exposed to heat. This material preferably includes a modified base polymer and is initially physically formed into a desired expanded shape. This desired expanded shape is "-memorized" by subjecting the material to a high energy radiation such as from an electron accelerator. After such material has memorized this shape, it is re-formed with reduced dimensions. Subsequent application of heat to the material results in a restoration of the material's desired expanded shape.

In a preferred method for separating chips in accordance with the invention, the chips of semiconductor material are located on a heat-actuated self-expandable substrate material which has memorized an expanded state. Heat is then controllably applied to cause an expansion of the heat-actuated self-expandable substrate material to its memorized state. As the substrate material expands, the chips are correspondingly separated from one another while retaining their relative position in the matrix.

The slice preparation processes of scribing, fracturing and chip separation may be conveniently carried out on the same substrate with a minimum of semiconductor material transfers. As described in a specific embodiment herein, a slice of semiconductor material is cemented on a heat-actuated self-expandable flat substrate. The slice is scribed such as with a diamond stylus in a matrix designed to separate the individual semiconductor chips. The slice is then fractured either by conventional techniques such as by rolling or by commencing an expansion of the substrate.

Substrate actuated fracturing may be obtained by using a heat-actuated self expandable substrate with a dome-shaped memory. A strong cover of sufficient flexibility to adapt to the memorized dome shape of the substrate is brought down over the scribed slice. Heat is applied to the flat substrate which expands towards its memorized dome shape against the cover. As the expanding substrate urges the slice against the cover, sufficient cover force is encountered to fracture the slice along the scribe lines. The radius of curvature of the dome is selected to cause individual severance of the chips from adjacent chips. The expansion of the substrate is accompanied by a lateral separation of the chips. Hence, upon removal of the cover, the slice has been fractured and the chips are separated and available for further use.

The separation of the chips with a heat-actuated self-expanding material advantageously provides accurate and uniform chip separations while retaining the chip orientations and relative positions. The self expansion of the material is sufficient to separate the chips for pick up by tweezers or a vacuum collet.

It is, therefore, an object of the invention to provide a convenient and reliable method and device for handling minute articles such as semiconductor chips and the like.

It is a further object of the invention to provide a method and device to separate and space semiconductor chips from a compact position in an array.

It is a still further object of the invention to provide a common apparatus for working a semiconductor slice for scribing, fracturing and to separate the chips.

Other objects and advantages of the method and device for handling semiconductor slice operations will be understood from the following descriptions of several embodiments in conjunction with the drawings.

BRIEF DESCRIPTION OF DRAWINGS

FIG. 1 is an end view of a self-expandable substrate in its expanded memorized shape.

FIG. 2 is an end view in elevation of a heat-actuated self-expanding substrate in the reworked reduced-size state and a semiconductor slice mounted thereto.

FIG. 3 is a perspective view of an apparatus employed to expand the heat-actuated self-expanding substrate of FIG. 2.

FIG. 4 is a greatly enlarged section view of a typical fractured semiconductor slice.

FIG. 5 is a greatly enlarged partial view of separated semiconductor chips on a self-expanded substrate.

FIG. 6 is a plan view of an alternate embodiment for a heat-actuated self-expandable substrate for separating semiconductor slices in accordance with the invention.

FIG. 7 is a section view of the alternate embodiment of a heat-actuated self-expandable substrate as shown in FIG. 6 with a semiconductor slice supported by the substrate.

FIG. 8 is a perspective of the expanded substrate with separated semiconductor chips.

FIG. 11 is a plan view of the expanded memorized shape of another configuration for a heat-actuated self-expandable substrate.

FIG. 12 is a plan view of the heat-actuated self-expandable substrate of FIG. 11 after its reworking into smaller dimensions.

FIG. 13 is a plan view of the substrate of FIG. 11 after its expansion to its memorized shape.

DETAILED DESCRIPTION OF EMBODIMENTS

Figure 1:
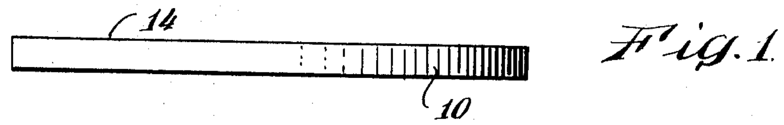
FIGS. 1 through 5 illustrate several steps of operation for separating semiconductor chips.
Figures 2, 3, 4, 5, 6:
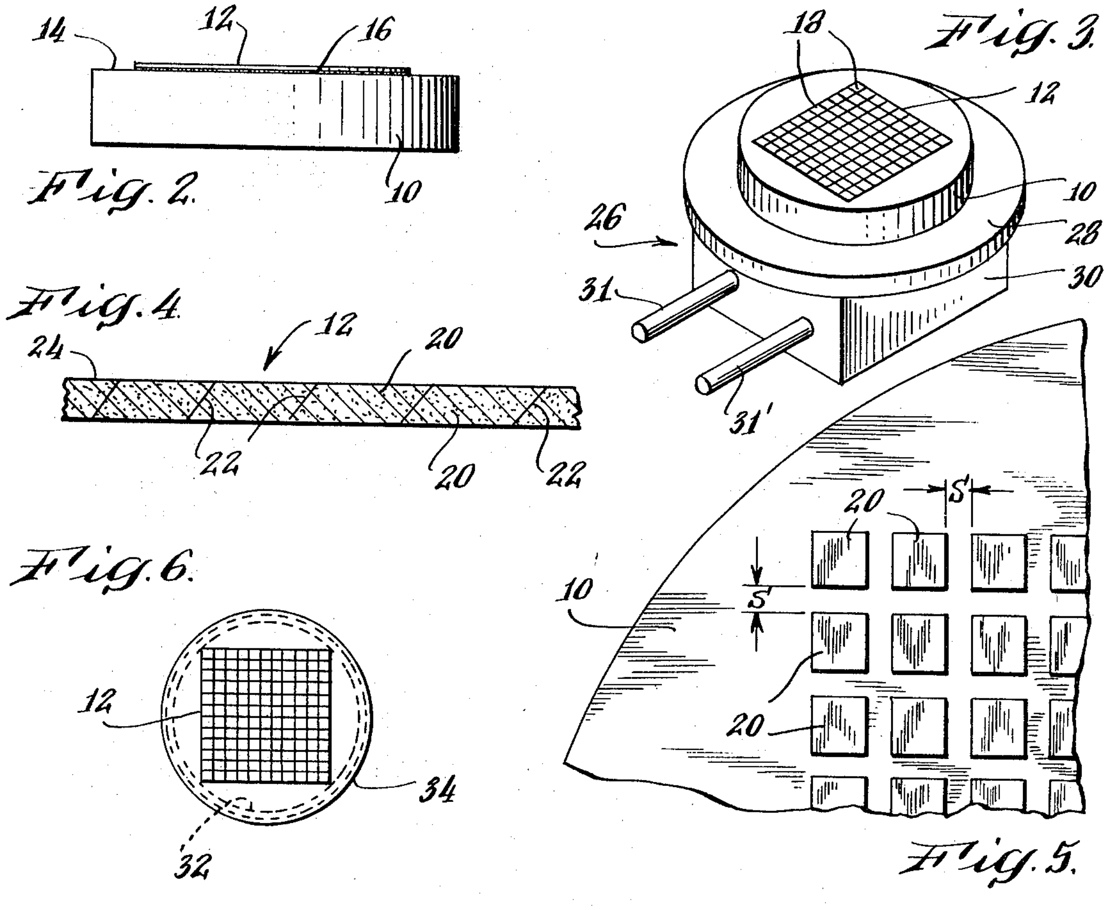
FIGS. 6, 7 and 8 illustrate several steps in the separation of semiconductor chips utilizing a heat-actuated self-expanding substrate material of alternate configuration.

With reference to FIGS. 1 through 5, a heat-actuated self-expandable substrate 10 is shown. The substrate is formed of a thermoplastic polymer which is characterized by forming molecular cross-links when irradiated by electrons such as from an electron accelerator. The thermoplastic material is initially formed into a desired final memorized shape as shown in FIG. 1 prior to being irradiated. After irradiation, the thermoplastic material is reworked into smaller size as shown in FIG. 2. Upon subsequent heating the reworked thermoplastic material expands into its desired final memorized shape. Such working of thermoplastic materials is well known as for instance employed in heat-shrinkable films and tubing. For further description of the thermoplastic material and working thereof, reference is made to a publication entitled "Commercial Implications of Radiation Processing of Plastics," by Walter Brenner at page 116 of Modern Plastics of April 1968 and the references cited by this publication.

The self-expandable substrate 10 is of circular shape. A semiconductor slice 12 is mounted upon the upper surface 14 with an adhesive layer 16. The slice 12 may have been previously fractured along scribe lines such as 18 and transferred to the self-expandable substrate 10 by well known transfer operations. If the slice has been previously fractured, the chips 20 are still arranged in compact array relationship. The slice 20 also may be fractured along the scribe lines 18 while emplaced on surface 14. This latter fracturing is preferably carried out with a sufficiently resilient adhesive layer 16 of desired thickness.

The adhesive layer 16 is of a type which is compatible with the materials employed for the semiconductor slice 12, i.e., providing low-tack adhesion without degrading contamination of the chemical or physical properties of the semiconductor elements formed in the slice 12. The adhesive should be applied as a matrix of extremely small spots so that each dot does not tend to hold to the adjacent dot in a manner which could constrain the chips — an adhesive applied in a sheet which melts to liquid state at a temperature the same as that which the substrate expands could also be used. A suitable adhesive is an adhesive known as PACLON No. 682 marketed by the Minnesota Mining & Manufacturing Company of St. Paul, Minnesota. The adhesive selected should provide sufficient adhesion to maintain the chips 20 on the surface 14, yet present a low tack that enables the chips to be removed by a vacuum pick-up or with a pair of tweezers.

FIG. 4 illustrates the cleavage lines 22 between the edges of the chips 20. These cleavages usually occur along crystal planes oriented relative to the upper surface 24 of slice 12 to result in overlapping edges.

The slice 12 may have a circular or rectangular shape and is preferably centered on the disc shaped self-expandable substrate 10. The substrate 10 and slice 12 are brought into heating relationship with a heat source 26 which may be an oven or is formed by a hot plate 28 and an electric heater 30. Leads 31-31' provide electrical connection to heater 30. Alternatively the heat-actuated self-expandable substrate and fractured slice assembly may be supported in alignment with a movable heat source or oven 26 which then is brought into proximity with the substrate 10.

The substrate 10 has a thickness which is selected commensurate with the heating time allotted to obtain an expansion. A short heating and expansion time is preferred to reduce exposure time of the semiconductor chips 20 to elevated temperatures. Hence, a thin substrate 10 is selected. However, the substrate should have a sufficient thickness to provide an adequately rigid support for the semiconductor chips 20, for subsequent handling and transportation. Typically, a self-expandable substrate of about one eighth of an inch thickness is suitable.

The temperature of the oven heat source or hot plate 28 is controlled within the range desired to expand the substrate 10. This temperature may vary depending upon the type of thermosetting polymer plastic selected for the substrate. Typical heating temperatures for a substrate of polyvinyl chloride is of the order of 200° C. Lower heating temperatures of about 125° C. may be used for a substrate formed of polyolefin material. Other heating temperatures may be selected by utilizing thermoplastic materials as listed in catalogs furnished by companies such as the Raychem Corporation of Menlo Park, California.

The total expansion of the self-expandable substrate 10 is preferably selected in view of the number of chips along any one dimension of the slice matrix as well as the chip separation S needed to clear adjacent chip edges from each other. The chip separation further is preferably selected to enable a collet on a vacuum pick-up to freely fit around any one chip for its removal from the substrate. A 20 percent expansion of the substrate surface 14 when substantially covered by a slice 12 generally provides adequate separation between the chips 20. The total expansion of substrate 10 is generally uniformly distributed between the chips 20, and is advantageously predictable to a high level of accuracy.

Figure 7:
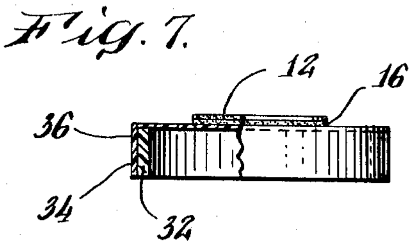
Figure 8:
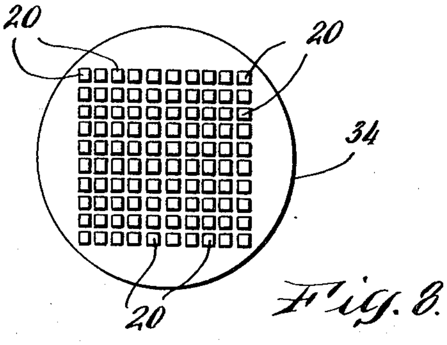

In the embodiment illustrated with FIGS. 6, 7 and 8, a heat-actuated self-expandable substrate is formed in the shape of a ring 32. A resilient thermoplastic disphragm 34, made of a thin plastic is cemented to the peripheral edge 36 of ring 32. A fractured slice 12 is placed on the diaphragm 34. Heat is then applied to the ring-shaped self-expandable substrate 32 which expands to its memorized shape and correspondingly expands the thermoplastic diaphragm 34 to spread slice 12 into separated chips 20. After the ring substrate 32 has expanded it remains attached to the diaphragm 34 which is thus unable to restore to its original shape of FIG. 6. The expanded ring substrate 32 provides a convenient support for the separated chips 20 for subsequent handling.

Figures 9, 10:
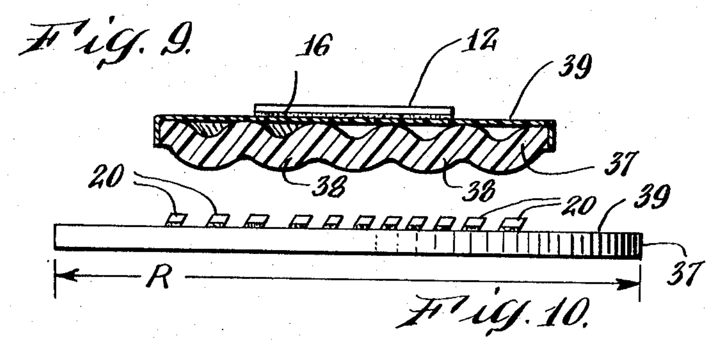
FIG. 9 is a section view of an alternate configuration for a heat-actuated self-expandable substrate and semiconductor slice mounted thereto.
FIG. 10 is an end view in elevation of the heat actuated self-expandable substrate configuration of FIG. 9 in the expanded state.

FIGS. 9 and 10 illustrate another configuration for a self-expandable substrate 37. Substrate 37 after having been irradiated to store an expanded disc shaped memory shape as illustrated with the disc shaped substrate 37 in FIG. 10, is worked to reduce its dimensions. The rework produces annular convolutions 38 to reduce the radial dimension R of substrate 37. An expandable membrane 39 is then cemented to the peripheral edge of substrate 38 to form a flat surface for receiving the semiconductor slice 12. The self-expandable substrate is then heated to expand to the flat disc shape shown in FIG. 10 with the separated chips 20.

Figure 11:
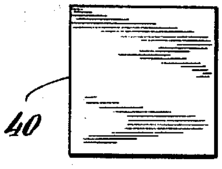
FIGS. 11, 12 and 13 illustrate the several steps employed for preparing still another configuration for a heat actuated self-expandable substrate.
Figure 12:
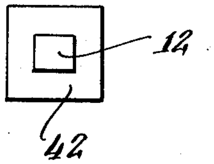
Figure 13:
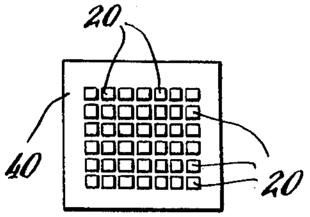

FIGS. 11, 12 and 13 illustrate the sequential steps of preparing a rectangular square shaped heat-actuated self-expandable substrate 40 for use in separating the chips. The square shaped substrate 40 is irradiated with an electron accelerator to memorize this expanded shape. The substrate 40 is then worked by compressing it to the smaller square shape 42 shown in FIG. 12. A fractured slice 12 is located on the reduced square substrate 42 and subsequently expanded to the memorized shape as shown in FIG. 13 with the chips 20 separated.

Figure 14:
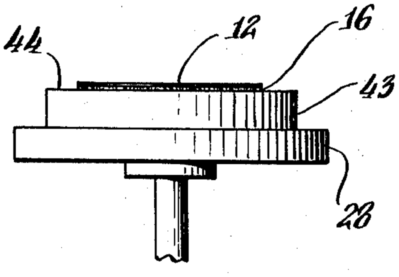
FIGS. 14, 15 and 16 are end views in elevation of an apparatus shown in sequential operating states for working a semiconductor slice to fracture the slice and separate the chips with a self-expandable substrate.
Figure 15:
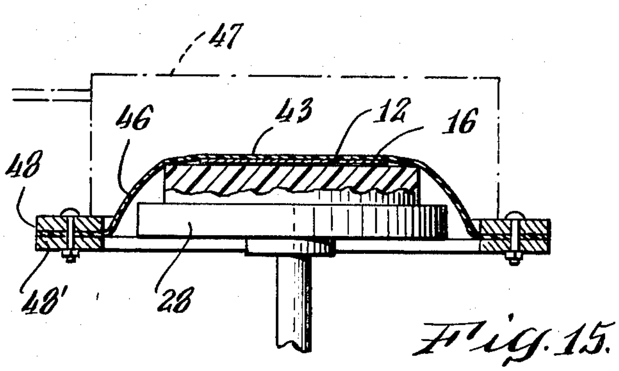
Figure 16:
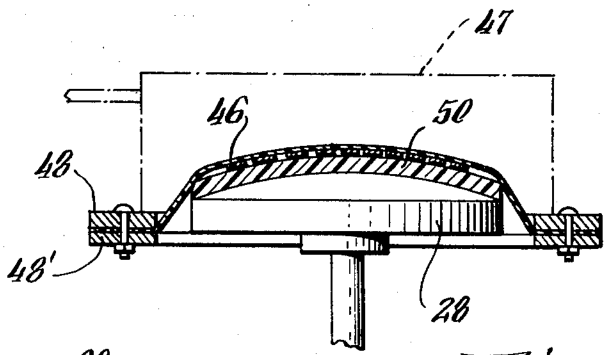

The apparatus 41 shown in FIGS. 14, 15 and 16 provides a common substrate work surface to scribe and fracture a semi-conductor slice 12 as well as separate the chips 20. A disc shaped heat-actuated self-expandable substrate 43 is provided with a flat reduced upper surface 44. A semiconductor slice 12 is mounted on surface 44 with an adhesive 16, which has been applied in the manner previously mentioned.

The disc substrate 43 is supported in an oven or on a hot plate 28 whose temperature is accurately controlled by a heat source (not shown). While the slice 12 is mounted on disc substrate 43 the slide may be scribed using conventional scribing devices.

After scribing of slice 12, a cover 46 formed of a strong and flexible material such as dental dam rubber or a suitable plastic, such as polyethylene, is secured over the scribed slice 12. A pair of annular rims 48-48' securely retain the perimeter of cover 46 in a fixed position. The rims 48-48' are brought down over the scribed slice 12 and disc substrate 43 to tautly locate cover 46 over the slice 12. Heat is then applied in an oven or to hot plate 28 to cause disc substrate 43 to expand.

Disc substrate 43 is formed from a previously expanded dome shape which was memorized by electron beam irradiation. The dome shape is then compressed to form the flat reduced upper surface 44.

When disc substrate 43 is heated to expand, it forms a pressure dome 50 having an enlarged upper surface 44 of generally the same or larger diameter as shown in FIG. 14. As the pressure dome 50 expands against cover 46, the latter resists the expansion and exerts pressure on slice 12, which commences to fracture along the scribe lines. As the disc substrate continues to expand into its full memorized dome shape, higher pressures are developed from cover 46 which causes a complete fracturing of slice 12. As suggested by the dotted line 47, a pressure cylinder may be located over cover 46 to reinforce the cover and provide sufficient force to fracture slice 12. In such case, cover 46 is preferably made of plastic with sufficient thickness to resist the pressures encountered. Pressure can also be applied to the underside of the dome to increase the fracturing force of the dome and lower the pressure differential.

Figure 17:
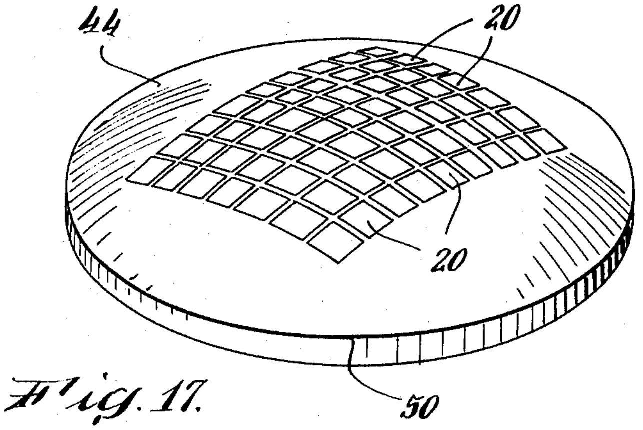
FIG. 17 is a perspective view of a self-expandable substrate employed with the apparatus shown in FIGS. 14 through 16.

Expansion of disc substrate 43 is accompanied with an enlargement of previously flat disc surface 44. This enlargement advantageously imparts a separation of the chips. As shown in FIG. 17, after the cover 46 has been removed, the now dome-shaped substrate 43 supports the individual chips which have been separated to facilitate their removal by vacuum pick-up or tweezers.

The effectiveness of the apparatus shown in FIGS. 13 and 14 is enhanced by selecting the curvature of dome shaped surface 44 in view of the dimensions of the individual chips 20 and the desired fracture pressure from cover 46 as the disc substrate expands against it.

Having thus described a self-expandable substrate for working semiconductor materials, its advantages can be appreciated Chip separations may be accurately controlled by selecting the expansion of the substrate commensurate with the size of the semiconductor slice and the number of chips obtained therefrom. Other self-expanding materials may be employed. Self-expanding metals or alloys such as NYTINOL may be used to separate the chips.

What is claimed is:

1. A method of separating articles from a compact position in an array comprising the steps of
   supporting the articles with a self-expandable substrate of a reduced size and having an expanded shape memory, and
   heating the self-expandable substrate to cause a self-expansion thereof to its memorized shape and separate the articles from one another.

2. The method of separating articles from a compact position in an array as claimed in claim 1 wherein the supporting step includes
   mounting a compact array of the articles with a low tack adhesive on a surface of the self-expandable substrate.

3. The method of separating articles from a compact position in an array as claimed in claim 2 wherein said mounting step is followed by the steps of
   scribing the array of articles to define fracture lines and
   applying pressure on the array of articles to fracture the array along the scribe lines.

4. A method of separating semiconductor chips from their compacted position in a fractured semiconductor slice comprising the steps of supporting the chips in their compact positions with a heat-actuated self-expandable substrate having a memorized expanded shape,
   applying heat to the self-expandable substrate to cause an expansion thereof to the memorized expanded shape and separate the substrate supported semiconductor chips from one another upon the self expansion of said substrate.

5. The method of separating semiconductor chips as claimed in claim 4 and further including the step of
   forming a compressed heat-actuated self expandable substrate with a memorized expanded shape selected commensurate with the dimensions of the slice and number of chips to be separated upon heating of the substrate.

6. The method of separating semiconductor chips as claimed in claim 5 wherein the forming step includes forming a heat-actuated self-expandable substrate of rectangular shape with an enlarged rectangular expanded shape memory.

7. The method of separating semiconductor chips as claimed in claim 5 wherein the forming step includes forming a head-actuated self-expandable substrate having a disc shape with a correspondingly radially enlarged expanded disc shape memory.

8. The method of separating semiconductor chips as claimed in claim 5 wherein the forming step includes forming a compressed heat-actuated self-expanded substrate having a ring shape with an enlarged expanded ring shape memory, connecting an expandable membrane over a side of the ring substrate with said semiconductor chips supported by the membrane, whereby said membrane is expanded upon the expansion of the ring.

9. The method of separating semiconductor chips as claimed in claim 4 and further including the steps of
   forming a heat-actuated self-expandable substrate material having a memorized expanded shape selected to provide accurate and predetermined separation of said semiconductor chips when expanded by the application of heat to memorized expanded shape and
   working said heat-actuated self-expandable substrate to reduce the size of a chip supporting side thereof by an amount commensurate with producing said accurate and predetermined chip separations upon substrate expansion.

10. A method of working semiconductor slices comprising the steps of
   supporting a semiconductor slice having a plurality of semiconductor elements arranged in an array with a heat-actuated self-expandable substrate material of reduced size and having a predetermined expanded shape memory,
   scribing the slice while supported by the self-expandable substrate material and severing the slice along the scribe lines to isolate the semiconductor elements on chips located in a compact array on the self-expandable substrate material,
   applying heat to the self-expandable substrate material to expand it to its predetermined memorized expanded shape and separate the severed chips from one another while retaining their relative positions and orientation in the array for subsequent ease of removal and use.

11. The method of working semiconductor slices as claimed in claim 10 and further including the steps of forming a heat-actuated self-expandable substrate material having a memorized expanded shape selected to provide accurate and predetermined separation of said semiconductor chips when expanded by the application of heat to the memorized expanded shape and working said heat-actuated self-expandable substrate to reduce the size of a chip supporting side thereof by an amount commensurate with producing said accurate and predetermined chip separations upon substrate expansion.

12. A device for separating semiconductor chips from their compacted position in an array comprising a heat-actuated self-expandable substrate material having a memorized expanded shape selected to provide separation of substrate supported semiconductor chips when expanded by the application of heat to the memorized expanded shape, said self-expandable substrate material having the chip supporting side reduced by an amount commensurate with producing said chip separation upon substrate expansion to the memorized shape.

13. The device for separating semiconductor chips as claimed in claim 12 wherein the memorized expanded shape is in the form of a dome.

14. The device for separating semiconductor chips as claimed in claim 12 wherein the memorized expanded shape is in the form of a disc.

15. The device for separating semiconductor chips as claimed in claim 14 wherein the memorized expanded shape has a rectangular form.

16. An apparatus for working a semiconductor slice having a plurality of semiconductor elements arranged in a compact array with the semiconductor chips to be separated with preserved array orientation comprising means for supporting the semiconductor chips, said supporting means including a heat actuated self-expandable substrate material with a generally flat chip supporting surface, said self-expandable substrate having a memorized expanded dome-shape selected to provide an expanded dome shape chip supporting surface upon heating of the substrate, means for producing a flexible uniformly distributed force against the generally flat chip supporting substrate surface, and means for heating the self-expandable substrate to cause dome-shape expansion thereof against the pressure producing means to fracture the semiconductor slice and separate the chips from one another.

* * * * *